(12) United States Patent
Menzies et al.

(10) Patent No.: US 8,285,568 B1
(45) Date of Patent: *Oct. 9, 2012

(54) HOME RESALE PRICE PROTECTION PLAN

(75) Inventors: Steven M. Menzies, Omaha, NE (US);
Jeffrey A. Silver, Omaha, NE (US);
Christopher W. Overton, Castro Valley, CA (US)

(73) Assignee: PriceLock Finance, LLC, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/110,251

(22) Filed: May 18, 2011

Related U.S. Application Data (63) Continuation-in-part of application No. 12/884,523, filed on Sep. 17, 2010, now Pat. No. 7,962,353, which is a continuation-in-part of application No. 12/760,629, filed on Apr. 15, 2010.

(60) Provisional application No. 61/170,791, filed on Apr. 20, 2009.

(51) Int. Cl.
*G06Q 40/00* (2012.01)

(52) U.S. Cl. .......................................... 705/4

(58) Field of Classification Search ............... 705/4, 35, 705/38
See application file for complete search history.

(56) References Cited

U.S. PATENT DOCUMENTS

| 7,809,591 | B1 | 10/2010 | Smith |
| 7,885,879 | B1 | 2/2011 | Smith |
| 7,890,403 | B1 | 2/2011 | Smith et al. |
| 2004/0260578 | A1 | 12/2004 | Jin |

OTHER PUBLICATIONS

John E. Burton, "Guaranteed Certificated Mortages in New York", The Journal of Land & Public Utility Economics, vol. 12, No. 2 (May 1936), pp. 191-193.
Christopher J. Mayer et al., "U. S. House Price Dynamics and Behavior Finance", Sep. 2007.
Christopher L. Foote, "Policymaking Insights from Behavioral Economics", US Federal Reserve of Boston, 2009.

*Primary Examiner* — Kambiz Abdi
*Assistant Examiner* — Stephanie M Ziegle
(74) *Attorney, Agent, or Firm* — Mark Nowotarski (57) ABSTRACT

A Home Resale Price Protection Plan provides a payment to a homeowner should the homeowner have to sell his or her house at a loss. In exchange for an upfront fee, the homeowner would receive a payment for the lesser of their actual loss or the loss calculated by multiplying their original purchase price by the proportional drop in an appropriate housing price index.

15 Claims, 6 Drawing Sheets

HOME RESALE PRICE PROTECTION PLAN

CROSS-REFERENCE TO RELATED APPLICATION

This application is a continuation in part of US nonprovisional patent application "Home Resale Price Protection Plan", Ser. No. 12/884,523, filed Sep. 17, 2010 now U.S. Pat. No. 7,962,353. Said application is incorporated in its entirety herein by reference.

Said application Ser. No. 12/884,523 is a continuation-in-part of US nonprovisional patent application "Home Resale Value Protection Plan", Ser. No. 12/760,629, filed Apr. 15, 2010. Said application is incorporated in its entirety herein by reference.

Said application Ser. No. 12/760,629 claims the benefit of US provisional patent application "Home Resale Value Protection Plan", Ser. No. 61/170,791, filed Apr. 20, 2009. Said application is incorporated in its entirety herein by reference.

COPYRIGHT AND TRADEMARK NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

The "PriceLock" logo and word is a registered trademark of PriceLock Finance LLC. The "Constitution Insurance Company" logo is a registered trademark of Constitution Insurance Company.

FIELD OF INVENTION

This invention is in the field of financial protection technology.

BACKGROUND

There is a long felt need for protecting homeowners from a downturn in the housing market.

SUMMARY OF THE INVENTION

The Summary of the Invention is provided as a guide to understanding the invention. It does not necessarily describe the most generic embodiment of the invention or all species of the invention disclosed herein.

A homeowner can be protected against an overall downturn in the housing market by participating in a Home Resale Price Protection Plan. A Home Resale Price Protection Plan is a contractual agreement between a Financial Services Provider and one or more homeowners. In exchange for a fee, each homeowner is entitled to a payment for a compensatable loss that he or she might experience when he or she resells his or her residence. The compensatable loss might be the actual loss he or she suffers or the loss that can be attributed to a market downturn, whichever is lesser.

The fees for a Home Resale Price Protection Plan can be based on a projection of a future trend in pricing of houses in the geographic region of a given home relative to current sales pricing. If the current selling price of houses is above the trend pricing, then relatively large potential claims against a Home Resale Price Projection Plan can be forecast. A Home Resale Price Protection Plan, therefore, would charge correspondingly higher fees. The probability of experiencing said claims can be based on an estimated frequency of housing price downturns and the historical turnover rate in houses. A long term upward trend in housing price will reduce the required fees. A slow turnover rate will also reduce fees.

The value of a Home Resale Price Protection Plan to a homeowner can be substantially increased if the Financial Services Provider is covered by one or more Contractual Liability Insurance Policies. The Contractual Liability Insurance Policy protects the homeowner in case the Financial Services Provider should be unable to satisfy the terms of the Home Resale Price Protection Plan contract.

The value of the Contractual Liability Insurance Policy itself can be increased if the insurance carrier providing said Policy is an Admitted Carrier in a given state. Thus, if both the Provider and the Carrier should fail, the homeowner would still receive at least some compensation from the Insurance Guarantee Fund of the state that licensed the Admitted Carrier and in which the Contractual Liability Insurance Policy was issued.

DETAILED DESCRIPTION OF INVENTION

The following detailed description discloses various embodiments and features of the invention. These embodiments and features are meant to be exemplary and not limiting.

Housing markets rise and fall in uncertain ways. This uncertainty means that homeowners can be exposed to significant financial risk when they purchase a residence. This can inhibit them from making the housing transitions they need when they need to make them.

Figure 1:
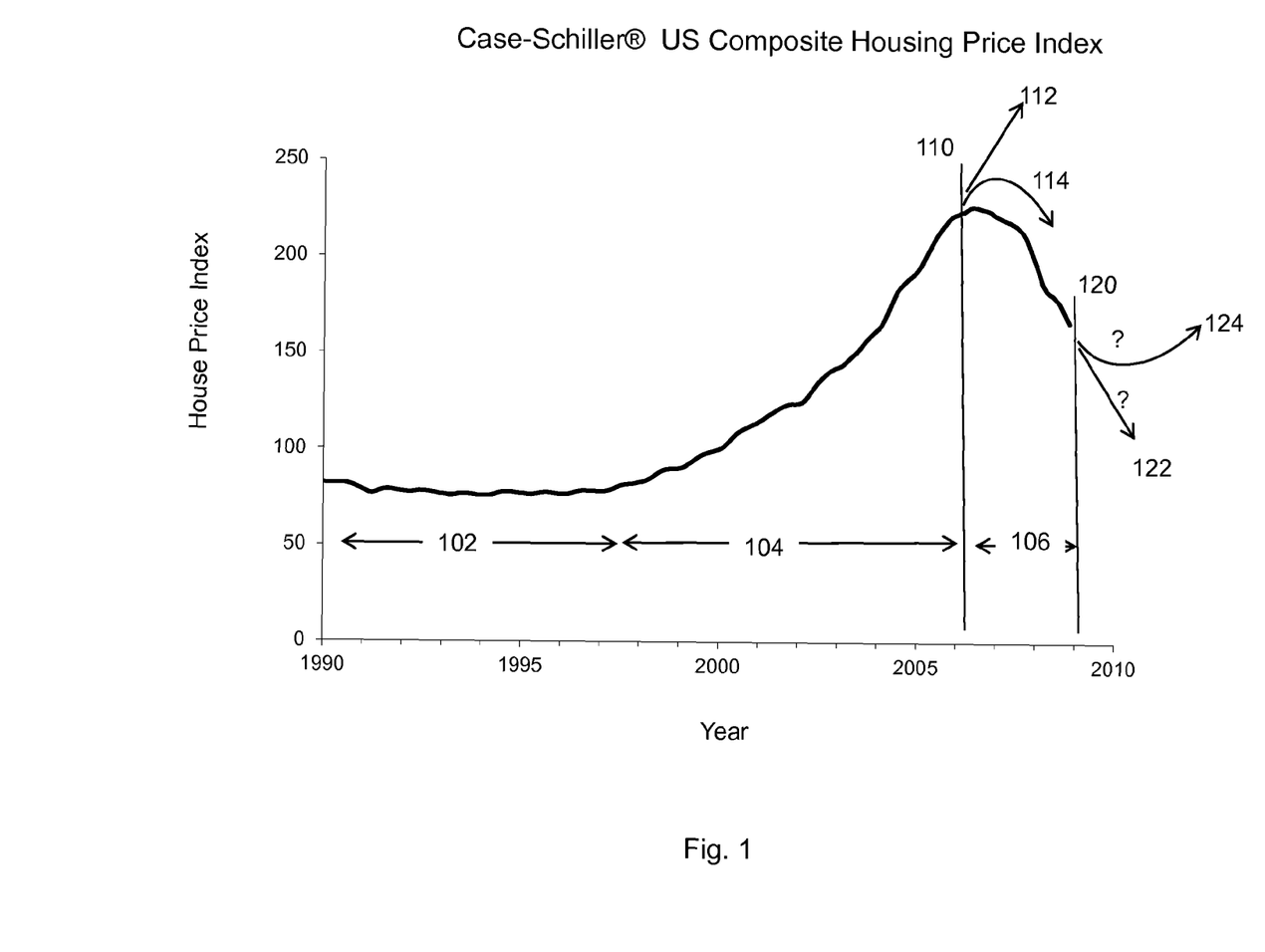
FIG. 1 is a graph of the Case-Schiller® US Composite Housing Price Index from 1990 to 2009.

FIG. 1 illustrates the nature of the uncertainty in the housing market. It shows a graph 100 of the Case-Schiller® US Composite Housing Price Index for the years 1990 to 2008. This index is a measure of US housing price shifts for repeat sales of different houses. It is in nominal units with the value set at 100 for the year 2000. It is not corrected for inflation.

From 1990 to 1998 (item 102 in FIG. 1), the US housing market was relatively flat. From 1998 to 2006 (item 104), the US housing market increased at an accelerating rate. From 2006 to 2009 (106), the US housing market decreased at an accelerating rate.

The uncertainty in future market movement stems from the fact that whereas for most of the time, housing price trends give an indication of future price movements, there are other times when the market makes a dramatic and unexpected change in direction. A buyer in 2006 (110), for example, looking back at the then-recent trends in the Case Schiller® Index might expect the then-future housing prices to continue to increase (112). In fact, housing prices underwent a dramatic decrease (114).

Similarly, a buyer in 2009 (120), might anticipate that prices will continue to decrease (122), but for any number of reasons, prices might instead level off or even increase (124).

In order to protect against downturns, a home buyer may elect to purchase a Home Resale Price Protection Plan at about the time that a house is purchased.

A Home Resale Price Protection Plan is a contractual agreement between one or more home buyers and a Financial Services Provider. In exchange for a fee, such as a fee in the range of 0.5 to 5.0% of a home sale price, the Financial Services Provider agrees to compensate a homeowner for losses he or she might experience when he or she sells his or her home in the future as a result of certain specified causes. The losses might be the lesser of the actual losses he or she experiences or the losses attributable to the drop in an appropriate housing price index. An appropriate index is the Case-Schiller® Housing Price Index. The Housing Price Index may be selected for the smallest geographic region available that encompasses the house in question. The details of an exemplary Home Resale Price Protection Plan, including alternative suitable house price indices, are presented in Appendix A.

A Financial Services Provider can increase the financial strength of a Home Resale Price Protection Plan by adjusting the availability of the Plan according to geography and time of sale of different covered houses.

Figure 2:
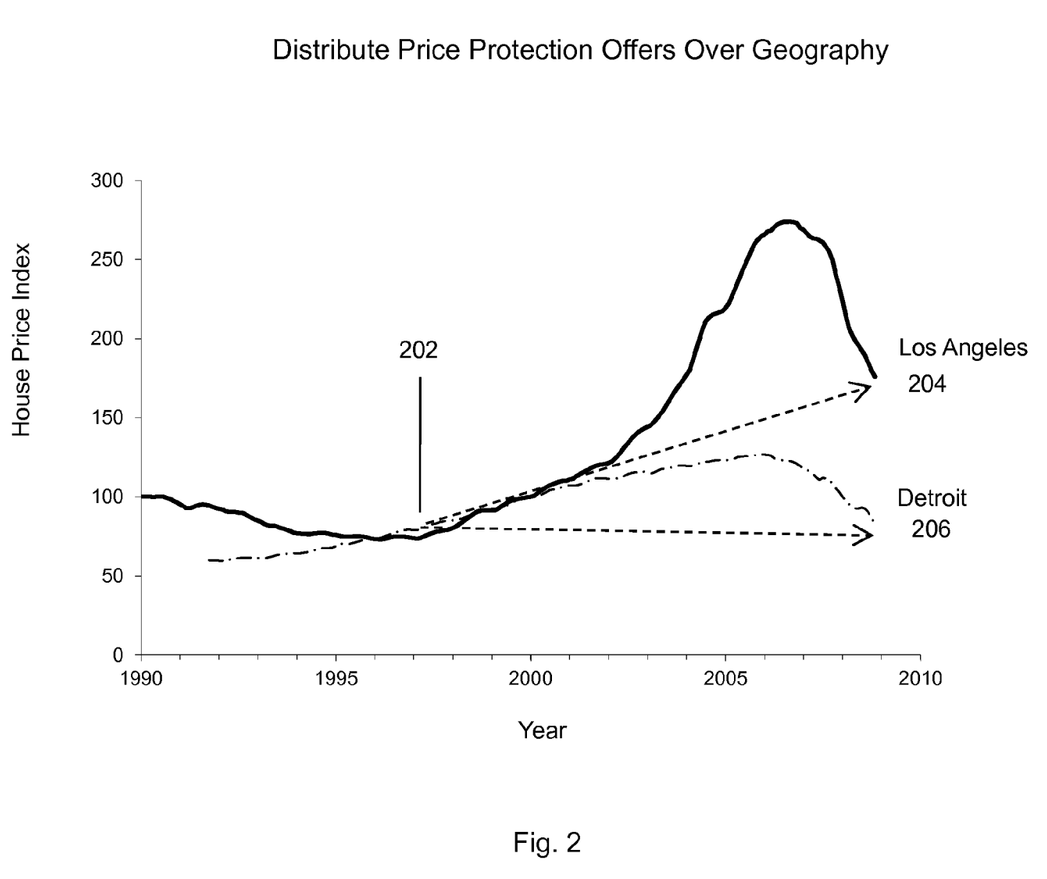
FIG. 2 is a graph showing how the financial strength of a Financial Services Provider can be increased by selling Home Resale Price Protection Plans over different geographies.

FIG. 2 illustrates (200) how a Housing Price Index for two different geographies, Los Angeles and Detroit, compare for the time period of 1990 to 2009. A Financial Services Provider offering Home Resale Price Protection Plans in 1997 (202), can increase its overall financial strength by offering plans to both Los Angeles home buyers as well as Detroit home buyers despite the then-recent slide in Los Angeles housing prices. If those home buyers then resold their homes in 2009, the Los Angeles home buyers would have seen an overall appreciation (204) whereas the Detroit home buyers would have seen a modest depreciation (206). Thus the fees collected from the Los Angeles home buyers would have been available to compensate the Detroit home buyers according to the Home Resale Price Protection Plan.

Figure 3:
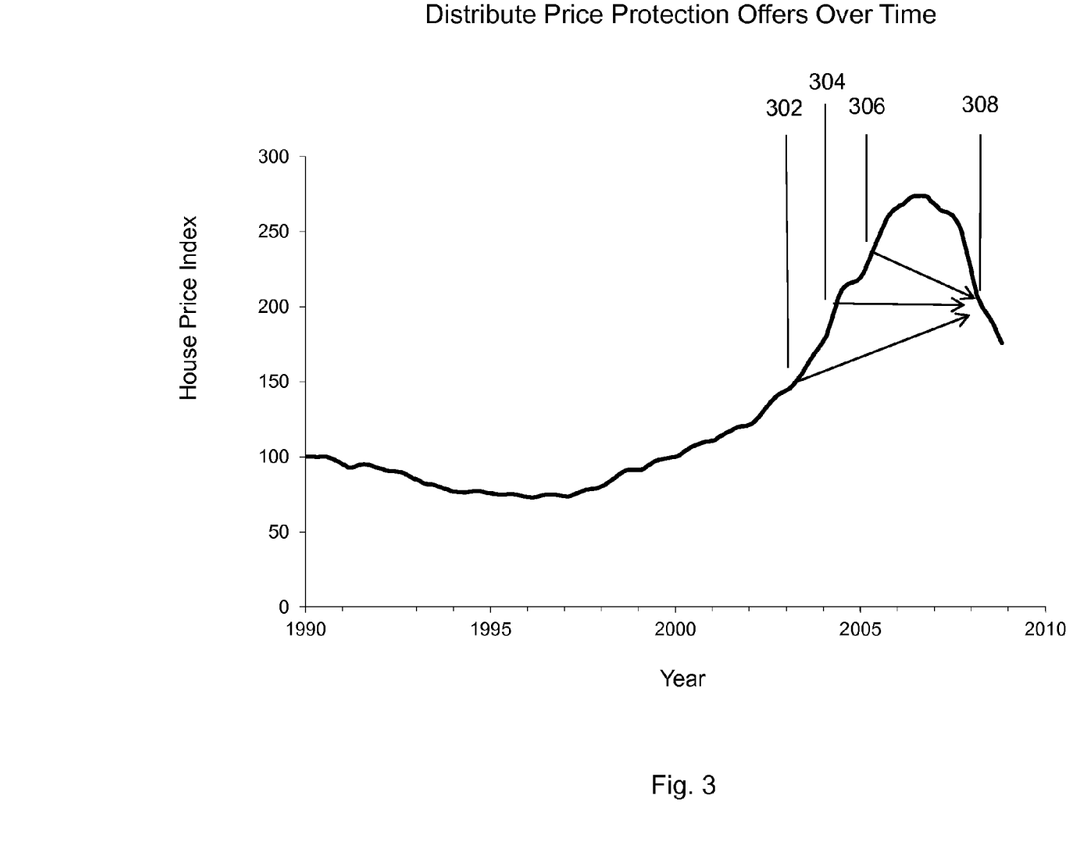
FIG. 3 is a graph showing how the financial strength of a Financial Services Provider can be increased by selling Home Resale Price Protection Plans over different times.

FIG. 3 shows an annotated graph of a housing price index versus time (300) that illustrates how a Financial Services Provider can increase the financial strength of a Home Resale Price Protection Plan by making sure that inception dates for Plans are distributed over time. If Plans are made available at different times, then fees collected from homeowners that bought at different times, but ultimately sold at the same time would be available to compensate those that suffered a loss. In the example shown, homeowners that purchased at time 302 and 304 either gained or broke even if they sold at subsequent time 308. Their fees would be available to compensate homeowners that purchased at time 306 and sold at time 308 and hence suffered a loss.

Setting Fees for a Home Resale Price Protection Plan

The fees for a Home Resale Price Protection Plan should be set so that there are sufficient funds to meet future projected obligations to pay claims. The basic equation for the minimum fee for a given house is:

$$\text{Fee}_i >= \int_{t=termbegin-\delta_1}^{termend+\delta_2} M_i(t) P_i(t) V(t) \, dt$$

where

Fee$_i$ is the fee charged to a given client i normalized by the cost of the house being protected;

i is an index number identifying said client;

termbegin is the time when coverage of the Home Resale Price Protection Plan begins;

termend is the time when said coverage ends;

$\delta_1$ is a first end effect adjustment period;

$\delta_2$ is a second end effect adjustment period;

$M_i(t)$ is the projected average magnitude of a claim that is made at time t;

$P_i(t)$ is the probability density function of a claim being made at time t; and $V(t)$ is a discount factor to give the present value of a future claim in present day dollars.

termbegin and termend can be set relative to the inception date of a policy. A suitable value for termbegin is in the range of 3 to 5 years. A suitable value of termend is 15 years or more.

The end effect adjustment period takes into account the fact that home owners have some ability to delay the sale of a home until coverage begins or accelerate the sale of a home before coverage ends so that they can make a claim against the Plan. The sales that would have normally occurred shortly before the start of coverage, therefore, should be taken into account. Similarly, the sales that would have normally occurred shortly after the end of coverage should also be taken into account. A suitable value for an end effect adjustment period is in the range of about 0 to 1 year. The end effect adjustment period can be set to different values at the beginning of coverage and end of coverage.

Figure 4:
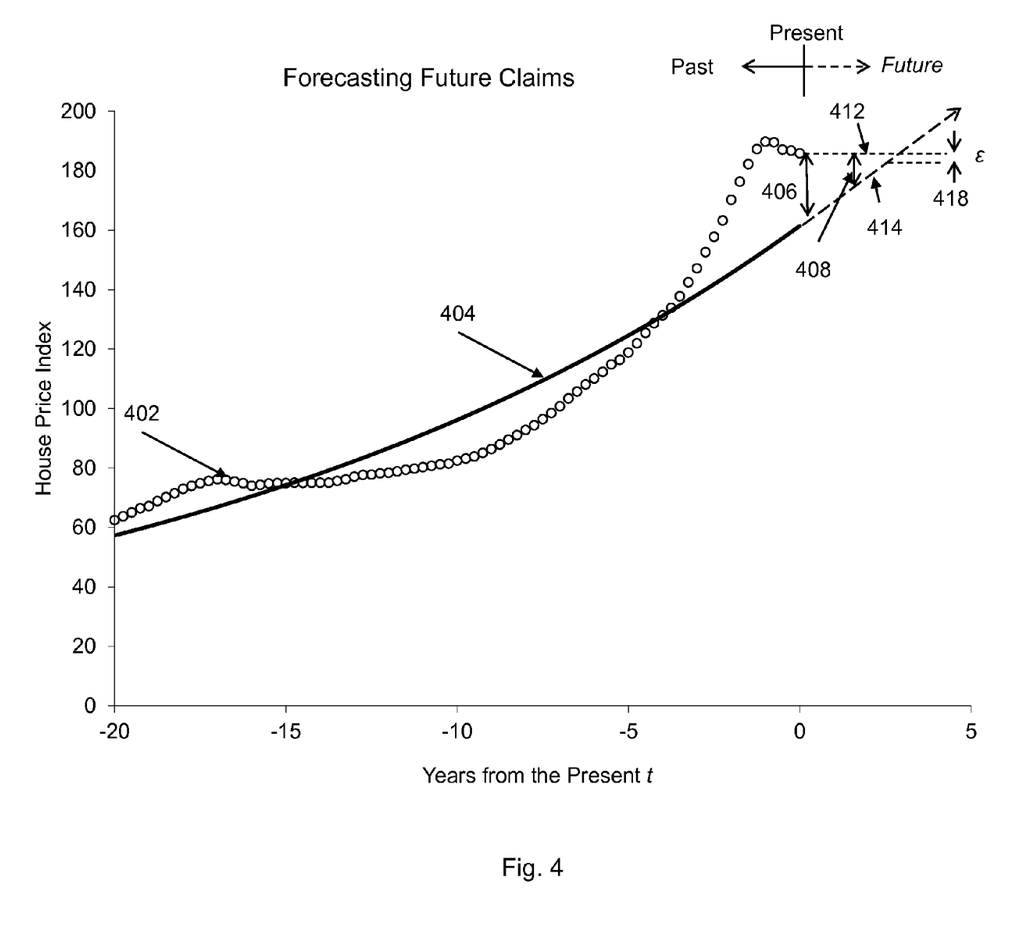
FIG. 4 is a graph showing how future claims against a Home Resale Price Protection Plan can be forecast using historical data for an appropriate housing price index and underlying trend analysis.

FIG. 4 illustrates how $M_i(t)$, the average projected magnitude of a claim at a future time t, can be calculated. FIG. 4 presents published data for a housing price index (HPI) versus time. A suitable index is the Case Shiller index for a given region where a house i to be covered is located. The values of the index 402 are published periodically, such as quarterly. Data is shown as "Years from the Present t". Thus "present" corresponds to t=0. Years in the past are negative numbers. Years in the future are positive numbers.

A trend curve 404 has been fit to the data. The trend curve can be fit using a least squares fit to the logarithm of the data. A minimum of 20 years of data should be fit. Preferably 30 or more years should be fit. A suitable equation for describing a trend curve is:

$$HPT(t) = HPT_0 e^{t/\tau_h}$$

where:

HPT(t) is the value of the housing price trend curve at a given time t;

$HPT_0$ is the value of the housing price trend curve at the present time (t=0); and $\tau_h$ is an exponential time constant for growth of the housing price index trend.

The values for $HPT_0$ and $\tau_h$ can be determined by selecting the values that minimize the expression:

$$SSR = \sum_{q=1}^{n} W_q [\ln(HPI_q) - (\ln(HPT_0) + (q^* \tau_o / \tau_h))]^2$$

where:
- SSR is the sum of the squares of the residual differences between natural log of the published housing price index (HPI) and the natural log of the trend curve;
- q is an index number of a given period of time;
- $\tau_o$ is the time period between publications of the housing price index, such as quarterly;
- $W_q$ is the value of a weighting function W at a given time index q; and
- $HPI_q$ is the published housing price index at time index q.

The weighting function $W_q$ can be selected to take into account external information about the projected future behavior of the housing market. A simple weighting function is a constant. A value of 1.0 is suitable for a normal market.

Alternatively, a step function is suitable for $W_q$ when external information indicates that recent values of a housing price index are not representative of the long term underlying trend. This can occur, for example, if there is a change in legislation, a discovery of a toxic waste in the region of a given house, unusually low mortgage rates, a policy that is likely to change, failures of markets to clear or an unexplained acceleration in housing price growth indicating a bubble market.

A suitable step function may have the form:

$$W_q = \begin{matrix} 0; q <= q_c \\ 1; q > q_c \end{matrix}$$

where:
- $q_c$ is the point in time where said departure from the underlying trend is indicated.

Small q's indicate more recent past. Large q's indicate more distant past. Thus if indications are that a bubble in housing prices commenced 10 quarters ago, $q_c$ would be 10 and more recent "bubble" data would be disregarded in estimating the parameters of the trend line.

A semicolon, as used herein in an equation, indicates that a following expression is a condition that must be met in order for a preceding expression to be valid. Thus "0; q<=$q_c$" means that Wq has the value of 0 if q, <=$q_c$.

Analytic expressions can be used to determine $HPT_0$ and $\tau_h$ in the above equation when $W_q$ is a constant. The calculations can be done on an appropriately modified computer.

$HPT_0$ and $\tau_h$ can be determined for more complicated weighting functions using computers modified to perform numerical minimization algorithms, such as Newton-Raphson method, or genetic algorithms. A more complicated weighting function might comprise an exponential weighting function where more recent data is weighted more heavily than data from further in the past.

$HPT_0$ and $\tau_h$ were calculated for the data presented in FIG. 4 with a constant weighting function of 1.0 for 20 years of prior history. The values produced where $HPT_0$=161.42 and $\tau_h$=19.31 years. The current published value for HPI, however, is 185.82. This indicates that the current market is inflated, and that there is a possibility of a market drop that could lead to claims against a Home Resale Price Protection Plan purchased for the indicated house at the current time. In particular, this method indicates that current housing price 412 is higher than the historical exponential trend curve expected value 406 by a factor of 1.15 (i.e. 185.82/161.42) or about 15%. This ratio can be used to estimate the magnitude of a future claim.

In order to forecast the magnitude of a claim being made at a future time t, the following expression can be used:

$$M_i(t) = \max\left(\left(1 - \frac{HPT_0}{HPI_0} e^{t/\tau_h}\right), \varepsilon\right)$$

where $\varepsilon$ is a residual value of a loss 418 that recognizes that a market downturn is always possible.

Thus, the forecast magnitude for an average claim 408 will be equal to the difference between the current value of the housing price index (412) and the future projected growth of the trend curve (414) or said residual value of loss, whichever is greater. A suitable value for the residual value of loss, $\varepsilon$, might be 0.005 or less.

Once a magnitude of a potential future claim is forecast, the next step is to forecast the probability that said future claim will be made. A suitable equation for calculating said probability $P_i(t)$ is:

$$P_i(t) = CD_i(t) * PS_i(t)$$

where:
- $CD_i(t)$ is the cumulative probability density function that said drop in price index for said house i has occurred prior to future time t; and
- $PS_i(t)$ is the probability density function that a said house i will sell at time t.

A suitable equation for $CD_i(t)$ is:

$$CD_i(t) = (1 - e^{-t/\tau_d})$$

where $\tau_d$ is the exponential time constant for the frequency of housing price drops in the region of house i.

A suitable value for $\tau_d$ is in the range of 5 years to 20 years. A suitable default value is 10 years.

More sophisticated expressions can be used for $CD_i(t)$ that take into account the volatility and inertia in HPI. External factors, such as the announcement of the closing of a large employer or the discovery of a local environmental hazard, can also be taken into account.

A suitable equation for $PS_i(t)$ is:

$$PS_i(t) = \frac{1}{\tau_s} e^{-t/\tau_s}$$

where $\tau_s$ is the exponential time constant for the rate of sale of houses in the region of house i.

A suitable range for $\tau_s$ is 3 to 12 years. A suitable default value for $\tau_s$ is 6 years. This corresponds 15% of the remaining houses at time t being sold in the next year.

Future claims can be discounted to present dollars using a discount rate. The discount rate can be the cost of capital for reserves or an index of return on investment. An equation suitable for discounting future cash flows is:

$$V(t) = e^{-t/\tau_i}$$

where $\tau_i$ is a discount time constant.

A suitable discount time constant is in the range of 10 to 30 years. A suitable default value is 20 years. This corresponds to a discount rate of about 5% per year.

Numerical Example

A suitable value for Fee, can be determined from the following values of the different parameters described above:

termbegin=0 years
termend=15 years
δ=0 years
$W_q$=1.0
$HPT_0$=161.42
$HPI_0$=185.82
$τ_h$=19.31 years
$τ_d$=10 years
$τ_s$=6 years
$τ_i$=20 years
ε=0
The equation for Fee, then becomes:

$$\text{Fee}_i >= \int_{t=0}^{2.72}\left(1 - \frac{161.42}{185.82}e^{t/19.31}\right)*(1-e^{-t/10})*\frac{1}{6}e^{-t/6}*e^{t/20}\,dt$$

Where 2.72 is the time that the forecasted growth in housing price index exceeds the current house sale price. Above that time, the value in the integral drops to E which for simplicity we have set to 0. Integrating this equation numerically on an appropriately modified computer gives an expected future claim rate for the given house i of about 0.0019 times the original sale price, or about 0.2% of the house sales price. $\text{Fee}_i$, therefore has to be at least this value or greater. Typical administrative costs might increase the minimum by a factor of 1.7 to give a minimum fee of 0.34% of the house sales price. Additional factors, such as volatility in the House Price Index, can also be taken into account to make sure the Fee, is large enough to provide adequate reserves to meet future obligations.

System for Providing Insurance for Home Resale Price Protection Plans

Figure 5:
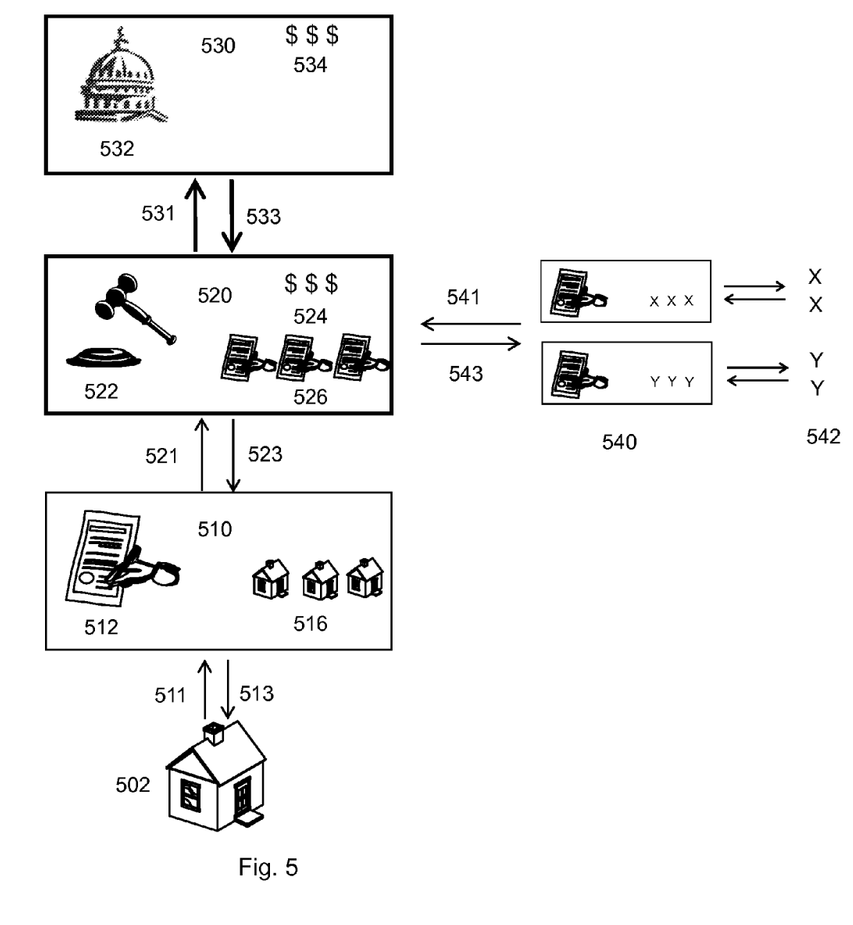
FIG. 5 illustrates how Contractual Liability Insurance can be provided for Home Resale Price Protection Plans, and other Financial Protection Plans.

FIG. 5 illustrates 500 a method and system for providing Contractual Liability Insurance to the Financial Services Provider who is providing Home Resale Price Protection Plans to homeowners.

A homeowner 502 seeking to obtain a Home Resale Price Protection Plan applies 511 to a Financial Services Provider 510. If the homeowner meets the underwriting criteria of the Plan, which may include the above considerations about geographic and time distribution of all Plans 516, then the homeowner is approved 513 and a Plan 512 is issued.

As part of the sales process, the Financial Services Provider can make the assertion that the Plan is fully insured if the Financial Services Provider obtains a Contractual Liability Insurance Policy from an Insurer 520. A Contractual Liability Insurance Policy provides that if the Financial Services Provider cannot meet the obligations of its Home Resale Price Protection Plans, then the Insurer will step into its shoes and, up to a certain limit of liability, meet the Financial Services Company's obligations under the Plan. The insurance carrier, for example, might insure each Plan up to $1,000,000. An exemplary insurance policy is shown in Appendix B.

The Financial Services Provider obtains Contractual Liability Insurance Coverage by applying 521 to a property casualty insurance carrier 520 for coverage. If the Financial Services Provider meets the underwriting criteria and pays the appropriate premium, then insurance coverage 523 will be provided.

Thus, even though a Home Resale Price Protection Plan is not considered insurance, it can nonetheless be insured to the benefit of the homeowner participating in the Plan.

There is additional security for the homeowner if the insurance carrier is an Admitted Insurance Carrier in a given state. In order to become admitted, a carrier must apply 531 to a state's insurance department 530. If the carrier meets the state's requirements for admission, such as financial strength measured by appropriate capital and surplus 524, and the use of approved insurance forms 522 (e.g. approved Contractual Liability Policy Forms), then it will be admitted 533 to write the approved insurance policies in that state. An alternative measure of financial strength of a given insurance carrier is its credit rating as provided by a credit rating agency, such as A.M. Best. An A. M. Best credit rating of A– or greater is suitable for an insurance carrier to be considered strong or excellent.

The homeowner does not have to be in the same state that the insurance carrier is admitted to in order for his or her Home Resale Price Protection Plan to be insured. The carrier can cover the homeowner through an appropriate insurance certificate issued under a master policy to the Financial Services Provider. An exemplary certificate is presented in Appendix B.

The insurance carrier can provide services beyond simply insuring the contracts of the Financial Services Provider. The insurance carrier, for example, can accept the obligations to pay substantially all of the claims of the homeowner. This can increase the overall financial efficiency of the process by allowing the present crediting of obligations to pay future claims on the books of said insurance carrier. Thus the net cost of the carrier paying all of the claims may be negative. This net cost can be taken into account in calculating the overall premium for a Home Resale Price Protection plan. The extent to which the insurance carrier can accept obligations to pay claims against an insured Home Resale Price Protection Plan may be determined by the regulations of the state of residence of the homeowner.

The financial strength of admitted insurance carriers is continually monitored. If a state should determine that an admitted carrier might not be able to meet its obligations, then the state might take over the carrier. The state would then access its Guarantee Fund 534 to pay the obligations of the carrier up to certain limits. These limits might be prescribed by the insurance statutes 532 of the State.

The financial strength of the insurance carrier can be further strengthened by offering 541, 543, Contractual Liability Insurance Policies to other entities 540 who might be providing different financial protection products 542 that are similar in nature to a Home Resale Price Protection Plan at least to the extent that said financial protection products are not classified or regulated as insurance. The insurance carrier can therefore develop a portfolio of policies 526 and thus distribute its overall risk.

Any extended warranty sold with a product could be a financial guarantee product. Electronics, such as televisions, cameras and other high end electronics, are usually accompanied by an offer of an "extended warranty" to repair and/or replace the product within a certain time frame should the product fail. Other large consumer purchases such as washers, refrigerators, dryers, computers, air conditioners, furnaces and automobiles all offer aftermarket warranties which are usually not treated as pure insurance products but are usually described as "Service Contracts" and may be suitable for contract insurance coverage.

Computer Implementation

Figure 6:
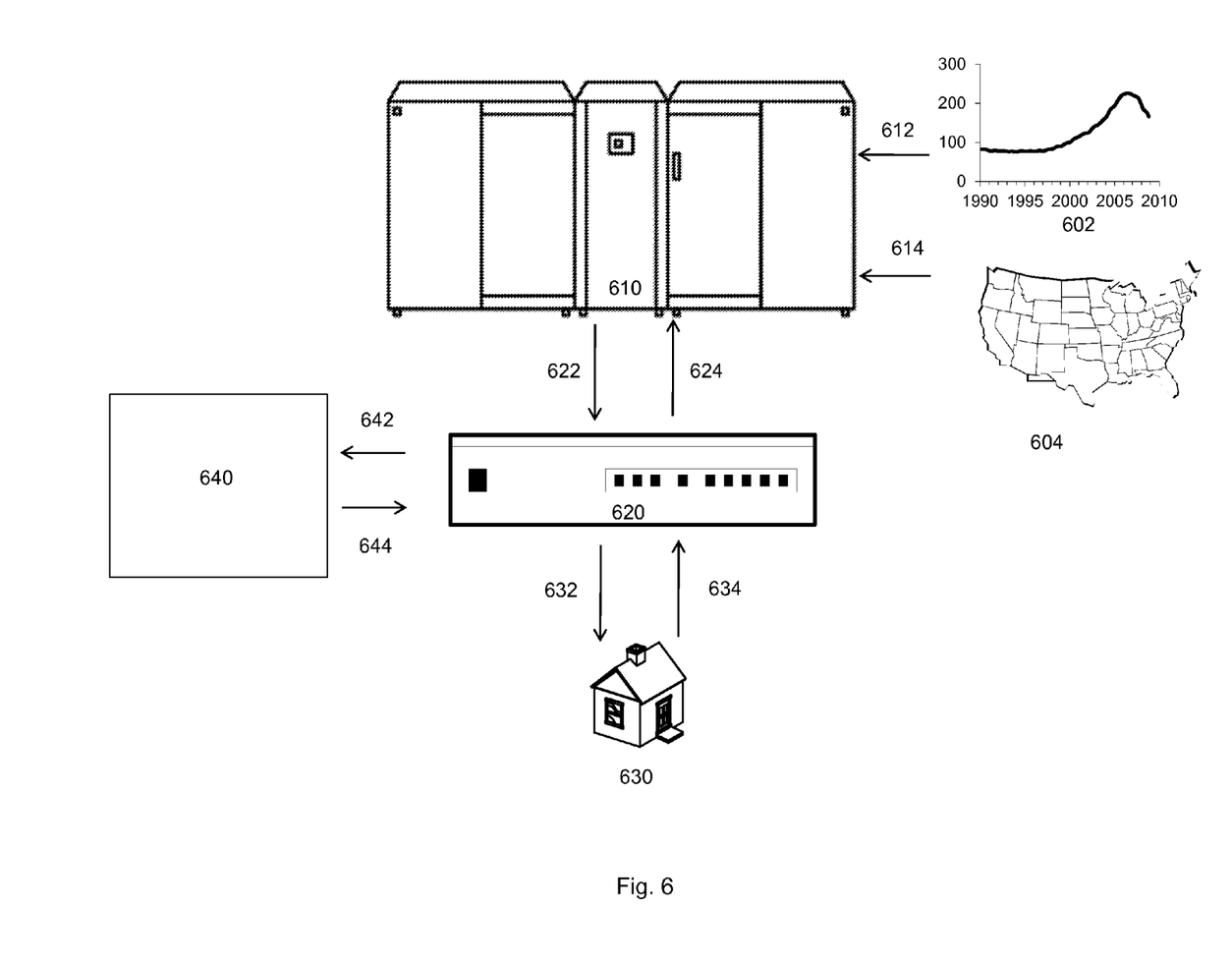
FIG. 6 illustrates one embodiment of a computer implemented information system capable of providing real time quotes to a prospective buyer of a Home Resale Price Protection Plan.

FIG. 6 illustrates an exemplary computer based system 600 for implementing a real-time quotation process for Home Resale Price Protection Plans. The system comprises a Transactional System 620 and an Analytic System 610.

The systems described herein comprise one or more of computers, peripherals, input devices, output devices and communication hardware. They further comprise tangible, non-transitory computer readable media. The computer readable media, in turn comprise tangible, non-transitory data and computer readable instructions which correspond to specific modifications made thereto such that the systems can perform the tasks described herein. Said tangible, non-transitory modifications can include the setting of a transistor-implemented flip-flop in the memory of said computer to a given output voltage corresponding to a bit of information encoding at least a portion of said instructions. Said output voltage would remain fixed and permanent unless acted upon by an outside force. Said outside force many include a change in supply voltage beyond a certain threshold or change in input voltage beyond a certain threshold.

Types of Policies Offered

Coverage in Home Resale Price Protection Plan contracts may be one of several Policy Types, with risks and claims depending on interactions between the larger economy, local economic and demographic characteristics, the demographics and lives of the homeowners, and the specific property protected.

All policy options include losses to home value upon resale if certain conditions are met.

- A first loss policy covers losses to home value upon resale subsequent to death, disability, or hardship experienced by one of the contracted homeowners.
- A joint loss policy covers losses to home value upon resale subsequent to death, disability, or hardship experienced by all contracted homeowners.
- A retirement policy covers losses to home value upon resale after at least a contracted number of years (the expected time for retirement), in addition to coverage as in a first loss policy above.
- A full policy covers losses to home value upon resale after at least a specifically contracted number of years, in addition to coverage as in a first loss policy above.

In each case, policies may expire (unless renewed) after a larger, also specifically contracted, number of years.

Back-End Systems

A Home Resale Price Protection Plan may include two back-end systems:

1) A Transactional System 620 is housed in a web server that is able to generate prospective contract documents in real time. These documents include Plan Pricing specific to:
   a) The Plan Type sought
   b) The applicant or applicants (e.g. ages for contract options related to subsequent disability)
   c) The protected residence (including exact location, and expected selling price.)
   d) In addition, the actual Sale Price of a House at the time the Plan document is generated may not be finalized. Thus the document specifies how the pricing depends on actual sale price.
2) An offline Analytic System 610 is used to maintain risk models used to populate data underlying the transactional site.

The Transactional System

After a purchase offer has been made for an eligible residence 630, a real estate broker who has contracted for permission to sell Home Resale Price Protection Plans enters information 634 on the prospective sale at the Transactional System web site 620. He or she then receives a prospective plan contract 632 for the buyer to sign along with closing documents. Upon receipt of closing documents 642, the Financial Services Provider 640 then ratifies 644 the final plan. Since the prospective plan contract is generated before closing, it is subject to some revision based on actual house sale price. The actual sale price is expected to lie within a range of the offered price, and determines the final fee for the Home Resale Price Protection Plan.

In another implementation, the prospective contract may be generated based on an offered price, in which case there is even more uncertainty in final house sale price.

Since the Transactional System must perform reliably and quickly (preferably without human oversight), all difficult calculations should be performed by the Analytic System.

The Transactional System may also perform real time underwriting. This is accomplished by specifying by zip code, the start date, end date, and pricing characteristics acceptable to the Financial Services Provider to generate prospective plan contract documents. Once generated, this document then specifies a latest date by which the house sale must close and the supporting materials that must be received by the Financial Services Provider in order for the Home Resale Price Protection Plan to enter into force as specified.

Zip codes may change over time, or may include parts of multiple cities, counties, or even metropolitan divisions or metropolitan statistical areas (as defined by the US Office of Management and Budget and possibly revised after each decennial US Census.) Thus, the Transactional System will preferably issue prospective plan contracts when these additional data are entered in their expected relationship to the zip code.

The Analytic System

Predicting future resale prices of homes in the long term is a very complex problem. In fact, actions based on failure to anticipate downturns in US home prices are recognized as one of the root causes for the US recession that began in 2007 and that spread to a global recession. Besides millions of homeowners who failed to anticipate their loss in equity in their homes, inadequate forecasting was also done by the many professionals dedicated to this task in such companies as banks, home builders, and mortgage insurers.

In order to remain financially viable, the Financial Services Provider should forecast not only regional changes in home prices, but also how this translates into losses from Home Resale Price Protection Plans. Some of the difficulties and how a Home Resale Price Protection Plan's Analytic System may address them include:

A. Limited benefits of diversification during periods of extreme price movement. As during periods of large, synchronized decreases in equity markets, the geographical correlation in home price declines has been very high (especially when considered within large clusters) compared to historical standards. This undermines usual actuarial modeling of distributions of independent events.

B. Behavioral economics: macroeconomic, regional, and specific to industrial sectors. Both optimism and pessimism tend to be contagious both within and between national and regional economies. Financial markets and housing markets tend to overshoot "rational" prices in both directions, showing intervals of high, and often unexpected, volatility. The Analytic System may include an "optimism" metric that predicts the extent of price change along the current short term trajectory relative to the longer term trend curve discussed above. A short term trajectory can be built from trends in rental vacancies as compared to housing vacancies, local price movement in relation to inflation and incomes, housing permits, starts, and inventory available for purchase.

C. Price patterns particular to housing. Since a large fraction of homeowners leverage their purchases by borrowing through mortgages, their first-loss position quickly erodes their equity should markets decline. Thus sellers are very reluctant to sell at a loss and lowered optimism is evidenced first by decreases in sales volume before prices begin to drop. Thereafter, sellers begin to accept losses if they are forced to, at which point price decreases may accelerate in a behavioral downturn. Conversely, housing euphoria tends to perpetuate itself, as buyers fear being priced out of the market if they do not quickly close a purchase. The Analytic System may include 612 a "housing cycle" metric 602 that indicates the depths of euphoria or pessimism. This is built from movement of prices and sales volume.

D. Data at varying geographical granularities, and of varying quality. The best estimate for housing might simply be based on desired variables at the smallest possible granularities in geography and in time. However, the same metric might vary much more in some locations, might be collected less reliably in some locations, and might simply be missing for some areas. This becomes especially difficult when combining data of several types, which besides having varied individual data problems, might be collected in very different ways and at different geographical granularities. For example, the Bureau of Labor Statistics specifically limits local reporting on employment for those industries in which there are too few employers to protect anonymity of their individual results. Within these constraints, good data are often available by county or even by city. By contrast, the main providers of housing price indexes usually offer no finer granularity than for metropolitan statistical areas. Such indexes are needed because raw home sale data, say as available from Multiple Listing Sales systems, fail to correct for different ways that sales patterns vary across price tiers, such as when more sales occur among lower-priced properties as wealthier homeowners try to wait out a housing recession. The risk of loss to the Financial Services Provider is much more sensitive to such issues of varying data quality and granularity than is a raw price forecast. For this reason, the Analytic System may compute a "missing data risk" multiplier to model related uncertainty. This model is based 614 on outlier behavior for local time series and on known geographical variation 604 extrapolated from other metrics.

E. Data delay. Some data (such as annual crime statistics) may be delayed by many months or even over a year, with data revisions delayed even more. The Analytic System may thus forecast underlying metrics to synchronize them in time. This allows for better unified modeling. Forecast uncertainty may be included in missing data risk mentioned above.

F. Unexpected legislative policy changes. Since legislation is affected by individual personalities, it is very hard to forecast. In some cases, one can make good guesses about which direction forces will move policy. However, details and timing of such changes are difficult to forecast. The Analytic System may include override settings where effects not readable from current time series may be entered. For example, when, in periods in 2008 and 2009, foreclosures appeared to decrease in several of the hardest-hit states (such as California), it was due to temporary delays in foreclosure proceedings by certain large lenders in anticipation of new federal measures to mitigate foreclosures. Earlier temporary drops in a few states were due to specific legislative changes.

G. Changes related to lending. The Analytic System may include affordability metrics, based on the relation of typical mortgage payments to typical income. In locations where the former is higher, associated with lower home ownership rates, changes in this relation affect a different part of the income distribution, which may also be estimated. However, purchase prices are affected not just by the cost of loans, but also by the availability of loans. This macroeconomic effect (sometimes with regional variation) is sensitive to the health and/or life support given to lenders, such as banks and government sponsored agencies (e.g. Fannie Mae and Freddie Mac.)

H. Varying tenure before reselling, and interaction with age. These may also modeled by the Analytic System.

I. Long-term local economic growth. Much macroeconomic literature deals with longer-term dynamics of economic development, usually at the level of whole countries. Such forecasts are notoriously fraught with error, but incorporate such data as population growth (by age, level of education, and other demographics, and due to migration in and out), employment growth (dependent on characteristics of labor markets and of the industries that employ them), and income growth (related to employment, and such other forms of income as from investments and government support.) To adapt this to a demand model for local housing markets, the Analytic System may also consider scarcity of housing, and such forms of desirability of an area as weather, favorable trends in crime rates, commute times, and quality of schools.

J. Special considerations during the late 00's recession. Many of the dynamics in the housing market from 2006 onward include extreme events not seen previously in available US data. These are associated with large departure from previously observed patterns, and are expected to settle down to steady-state conditions very different than before. At this point we mention localized foreclosure waves and unprecedented prevalence of distress sales. The Analytic System may model these conditions dynamically, making frequent adjustments in response to new incoming data, until a new regime has emerged and the markets are more stabilized.

Relationship between Analytic System and Transactional System

The Analytic System provides updated pricing models 622 to the Transactional System. Said providing may be by a modem communicating via the Internet or other network, or tangible computer readable media, such as a disk or computer memory device. The updated models may be provided on a periodic basis, such as daily, or an ad hoc basis, such as when a pricing model is updated due to a significant but unforeseen event.

The Analytic System may also receive 624 information from the Transactional System. Said receiving may be on a real time basis. Said receiving may be by a modem communicating via the Internet or other network, or tangible computer readable media, such as a disk or computer memory device. This information may include number of plans sold, house sale prices etc. The Analytic System can then take this information into account when developing pricing models. The Analytic System, for example, may modify the pricing algorithm so that it will increase the price of the plan in a given geographic area if the number of plans sold in said area exceeds a threshold.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

We claim:

1. A system for providing a Home Resale Price Protection Plan price quote to a given client who is a prospective buyer wherein said price quote comprises a fee for said Home Resale Price Protection Plan and wherein said system comprises:
   a. a Transactional System which comprises a first computer for accepting applicant information and for providing said price quote based on a pricing model; and
   wherein said first computer is specifically modified to calculate said fee for said Home Resale Price Protection Plan for said given client purchasing a house to be protected and wherein said specific modification comprises computer readable instructions for calculating said fee according to the relationship:

$$\text{Fee}_i >= \int_{t=\text{termbegin}-\delta_1}^{\text{termend}+\delta_2} M_i(t) P_i(t) V(t) \, dt$$

where:
   $\text{Fee}_i$ is said fee to be charged for said given client i normalized by the cost of said house being protected;
   i is an index number of said given client;
   termbegin is when the coverage of said Home Resale Protection Plan begins;
   termend is when said coverage of said Home Resale Price Protection Plan ends;
   $\delta_1$ is a first end effect adjustment period;
   $\delta_2$ is a second end effect adjustment period;
   $M_i(t)$ is a forecasted magnitude of a future claim made at time t;
   $P_i(t)$ is a forecasted probability density function of said future claim being made at time t; and
   $V(t)$ is a discount factor to give the present value of said future claim in present day dollars.

2. The system of claim 1 wherein:

$$M_i(t) = \max\left(\left(1 - \frac{HPT_0}{HPI_0} e^{t/\tau_h}\right), \varepsilon\right)$$

where:
   $HPT_0$ is the value of a trend curve for a housing price index at time t=0;
   $\tau_h$ is a time constant for the exponential growth rate of said trend curve;
   $HPI_0$ is the value of said housing price index at time t=0; and
   $\varepsilon$ is a residual value of loss; and
   wherein $HPT_0$ and $\tau_h$ are selected to fit said trend curve to a first period of data for said housing price index; and
   wherein said house to be protected is within a geography covered by said housing price index.

3. The system of claim 1 wherein:

$$P_i(t) = CD_i(t) * PS_i(t)$$

where:
   $CD_i(t)$ is the cumulative probability density function that said drop in price index for said house i has occurred prior to future time t; and
   $PS_i(t)$ is the probability density function that a said house i will sell at time t.

4. The system of claim 3 wherein:

$$CD_i(t) = (1 - e^{-t/\tau_d})$$

where:
   $\tau_d$ is the exponential time constant for the frequency of housing price drops in the region of house i.

5. The system of claim 4 wherein $\tau_d$ is in the range of 5 years to 20 years.

6. The system of claim 3 wherein:

$$PS_i(t) = \frac{1}{\tau_s} e^{-t/\tau_s}$$

where:
   $\tau_s$ is the exponential time constant for the rate of sale of houses in the region of house i.

7. The system of claim 6 wherein $\tau_s$ is in the range of 3 years to 12 years.

8. The system of claim 1 which further comprises an Analytic System, said Analytic System comprising a second computer including a pricing algorithm comprising said pricing model wherein said Analytic System has been specifically modified to update said pricing model and provide the resulting updated pricing model to said Transactional System wherein said specific modification of said Analytic System comprises computer readable instructions to perform said update and provide said update to said Transactional System.

9. The system of claim 8 wherein said Analytic System has been specifically modified to receive the number of plans sold and house price data from said Transactional System and wherein said specific modification of said Analytic System comprises computer readable instructions for modifying said pricing model such that a price quote for a Home Resale Price Protection Plan in a given geographic area increases if the number of plans sold in said given geographic area exceeds a threshold value.

10. The system of claim 8 which further comprises a modem for providing said update to said Transactional System.

11. The system of claim 1 wherein said first end effect adjustment period is in the range of 0 to 1 year.

12. The system of claim 1 wherein said first end effect adjustment period is the same magnitude as said second end effect adjustment period.

13. The system of claim 1 wherein termbegin is in the range of 3 to 5 years.

14. The system of claim 8 which further comprises a tangible computer readable media for providing said update to said Transactional System.

15. The system of claim 8 which further comprises a computer network for providing said update to said Transactional System.

* * * * *